Oct. 22, 1929.  I. TORNBERG  1,732,247
VARIABLE SPEED DEVICE
Filed July 30, 1928   8 Sheets-Sheet 1

Fig.1.

INVENTOR
ISIDOR TORNBERG
BY Sheffield Betts
HIS ATTORNEYS.

Oct. 22, 1929.  I. TORNBERG  1,732,247
VARIABLE SPEED DEVICE
Filed July 30, 1928   8 Sheets-Sheet 3

INVENTOR
ISIDOR TORNBERG
BY Sheffield & Betts
HIS ATTORNEYS

Oct. 22, 1929.         I. TORNBERG         1,732,247
VARIABLE SPEED DEVICE
Filed July 30, 1928         8 Sheets-Sheet 4

INVENTOR
ISIDOR TORNBERG
BY Sheffield Betts
HIS ATTORNEYS.

Oct. 22, 1929.　　　I. TORNBERG　　　1,732,247

VARIABLE SPEED DEVICE

Filed July 30, 1928　　8 Sheets-Sheet 5

INVENTOR
ISIDOR TORNBERG
BY Sheffield & Betts
HIS ATTORNEYS.

Patented Oct. 22, 1929

1,732,247

UNITED STATES PATENT OFFICE

ISIDOR TORNBERG, OF PLAINFIELD, NEW JERSEY

VARIABLE-SPEED DEVICE

Application filed July 30, 1928. Serial No. 296,149.

This invention relates to certain improvements in variable speed power transmission devices used in connection with any mechanism where a continuous uninterrupted transmission of power is desired between a driving device, such as an electric motor or other source of power, and a driven member or machine, and where the variation of speed is accomplished progressively either to decrease the speed, bring the driven shaft or member to a standstill and reverse the speed, or to increase the speed above that of the source of power and to decrease the same through a standstill of the driven member and also to reverse the rotation of the driven member.

Among the special objects of my invention is the capability of transmitting power in either direction relative to the direction of rotation of the driving member, the driving member or shaft and the driven member or shaft being in alignment with each other, so that the variable speed device may be inserted in a continuous shaft without laterally located devices for transmitting the power from the speed changing device away from the shaft and back to the shaft.

A further object of the invention is to produce a speed changing device in which the driving members or connections come into action successively without relative motion, so that whatever teeth or engaging members are employed between the connecting members, there is no tendency for the teeth to become worn or the friction engaging members or the plates thereof to become abraded.

A further object of the invention is to provide a direct transmission power continuously throughout the entire range of speeds forward as well as backward as concerns the driven member.

Aside from the transmission mechanism described and claimed in my prior Patent No. 1,282,495, issued October 22, 1918, the devices by which it has been sought to obtain variable speeds in a driven member may be divided into three classes:—Frictional devices in which an adjustable friction roll or belt has been used to vary the speeds by acting between a driving and a driven rotating member; secondly, devices wherein the power is transmitted through successive impulses by giving the driving member an oscillating motion whereby ratchets or pawls are made active upon the driven member; and thirdly, variable speed devices produced by hydraulic transmission wherein the speed is changed by "by-passing" some of the fluid used in the transmission, thereby reducing the quantity of flow through the parts for operating the driven member. All of these devices have various limitations, among which are included the inability of reversing the action upon the driven member, the inability of the device to act as a retarding device such as when used as a brake upon an automobile in descending a hill, and also a comparatively small range of maximum and minimum speeds, and a reduction in torque.

Nearly all of such devices are not positive in their action, that is, the speed ratio between the driving and driven members is not maintained constant when the variable speed has been fixed at a desired rotation of the driven member. This is usually due to wearing of the parts where friction is employed, to uncertainty of the action of pawls, and to variation in the amount of fluid which is by-passed or its uncertain action upon the driven member through slipping or variations in temperature causing a change in viscosity and other by-factors.

In the devices involved in this invention, the action upon the driven member is always positive as are gear driven parts and is subject to no variation whatever when the speed has once been set for the desired rate of rotation for the driven member. A further advantage of my improved variable speed devices is that the same may be produced without necessitating the manufacture of a large number of gears or sets of gears and with the entire elimination of beveled or mitered gears or of screw or worm gears in the driving parts.

A further advantage of the device described herein is that it can be carried in stock in much the same manner as electric motors and can be applied to meet the requirements of various manufacturers of machines in which variable speed is required, such as may be found in baking machinery, conveyors, motor boats where the screw propeller may be varied between wide lifts when running both in forward and reverse directions as well as to stop the craft and also may be easily adapted for use as transmission mechanism in automobiles without the necessity of employing the usual transmission clutch.

Further objects and advantages of my improved mechanism will appear from consideration of the following description taken in connection with the accompanying drawings, in which.

Broadly speaking, the transmission mechanism which forms the subject of this specification comprises three main elements: (1) the driving element, or constant speed element, which is rotated by the source of power; (2) the driven element or variable speed element, which is connected with the apparatus to be driven; and (3) the intermediate driving elements, which transmit power from the driving element to the driven element and by means of which the desired speed reductions are obtained.

In the drawings, the numerals 1 and 2 indicate respectively the upper and lower halves of a substantially cylindrical outer casing enclosing the apparatus of the present invention. These two halves of the outer casing may be and preferably are provided with two or more sets of co-operating lugs 3 and 4, on each side of the center line into which the bolts 5 are threaded to fasten the two parts of the outer casing securely together. The lower part of the casing is provided with four brackets 6, which are adapted to support the apparatus and which are made with one or more holes 7 thru which a bolt or other means may be passed to fix the apparatus firmly in position. The two end faces of the outer casing are recessed, as indicated at 8, and are adapted to have connected thereto the cover plates 9 and 10, at the driving and driven ends of the apparatus respectively. These cover plates 9 and 10 may be securely fastened to the outer casing by means of cap screws (not shown) or in any well known manner.

Figure 1:
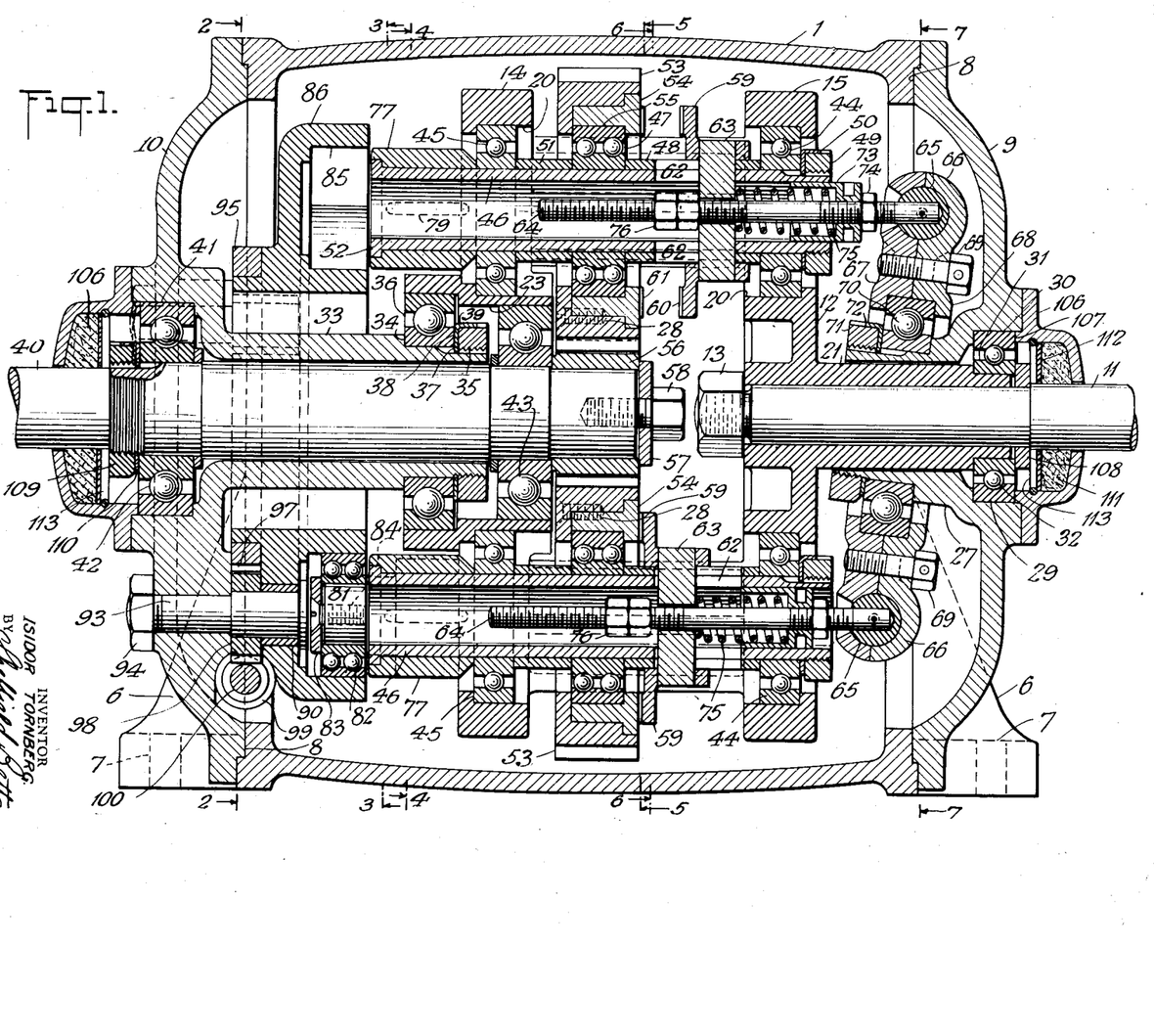
Fig. 1 is a longitudinal cross sectional view of a preferred embodiment of the present invention showing the parts in operating position, and being taken substantially on the line 1—1 of Fig. 2. In order to better illustrate the relation of certain parts of the apparatus with respect to one another, a section of the cam illustrated in this figure and to be described more fully hereinafter, has been taken substantially along the line 1A—1A of Fig. 2.
Figure 2:
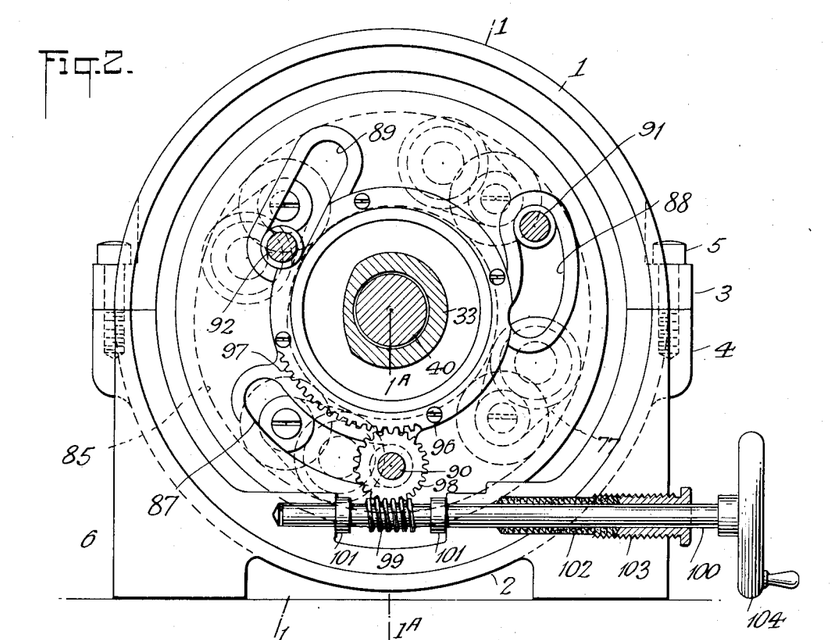
Fig. 2 is a cross-sectional view of the apparatus taken substantially along the line 2—2 of Fig. 1 with the cover at the driven end of the apparatus removed so as to illustrate the outer face of the cam member and to more fully show the means for supporting this cam member.
Figure 3:
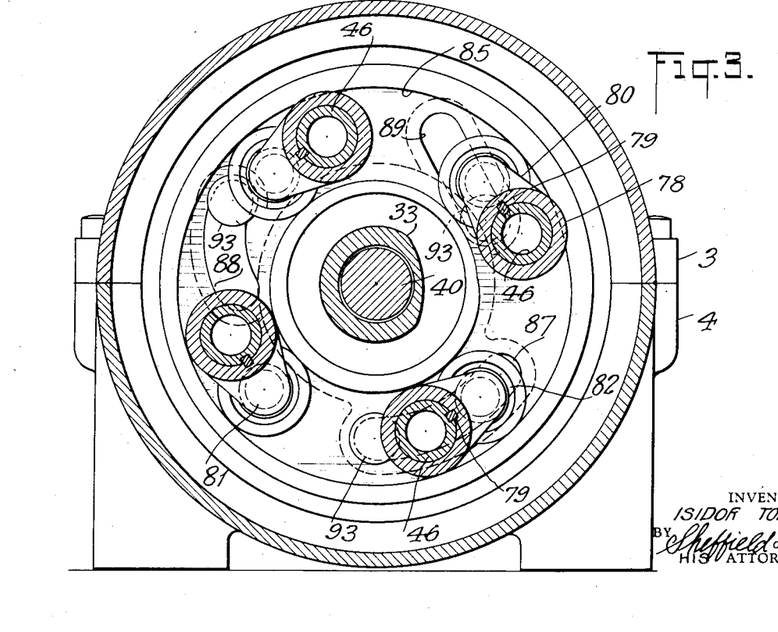
Fig. 3 is a cross-sectional view of the apparatus taken substantially along the line 3—3 of Fig. 1.
Figure 4:
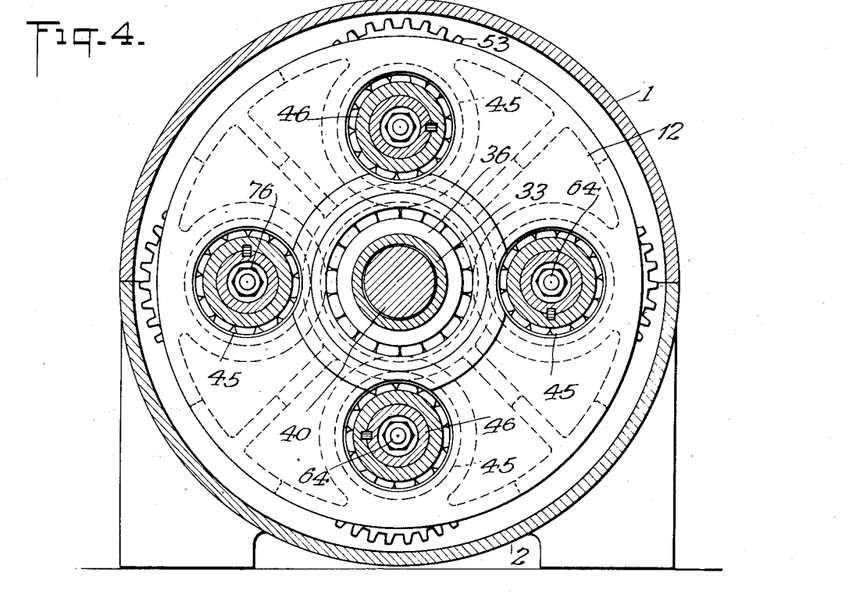
Fig. 4 is a cross-sectional view of the apparatus taken along the line 4—4 of Fig. 1, showing the respective positions of the four intermediate driving shafts and the driven shaft.
Figure 5:
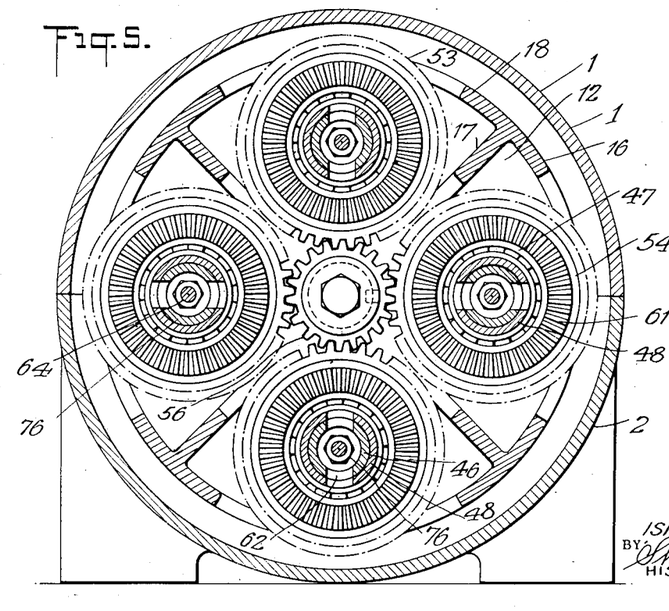
Fig. 5 is a cross-sectional view of the apparatus taken substantially along the line 5—5 of Fig. 1, illustrating the system of four planetary gears in engagement with the central or sun gear mounted upon the driven shaft, and also the clutches with which the planetary gears are turned.
Figure 6:
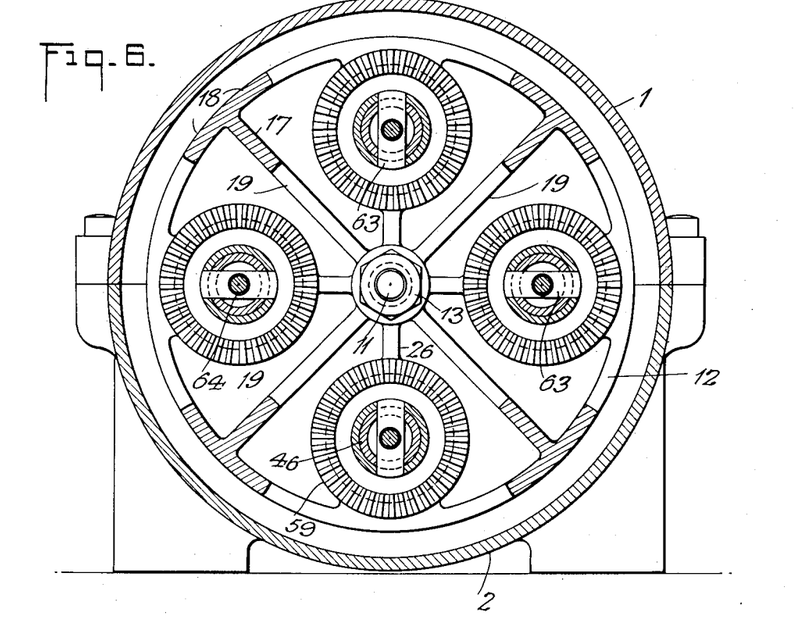
Fig. 6 is a cross-sectional view of the apparatus taken substantially along the line 6—6 of Fig. 1, showing the positions of the four intermediate driving shafts with respect to the frame or driving element which causes them to revolve about the center line of the apparatus.

The driving shaft 11 of the apparatus is connected to a suitable source of power, such, for example, as an electric motor, and is mounted at the outside end of the frame or driving element 12, which is held in position on the end of the shaft 11 by means of the nut 13 threaded on the end thereof, as is clearly illustrated in Fig. 1.

Figure 8:
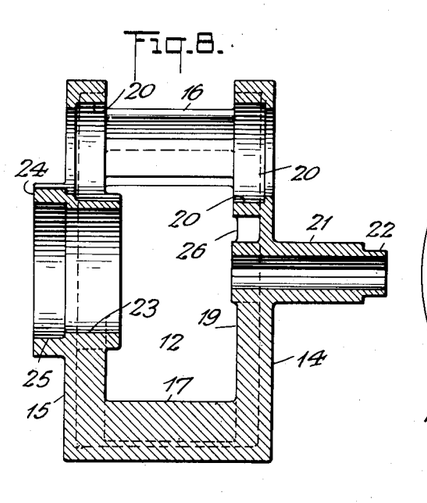
Fig. 8 is a longitudinal-sectional view of the frame or driving element in which the four intermediate driving shafts are mounted taken substantially along the line 8—8 of Fig. 9.
Figure 9:
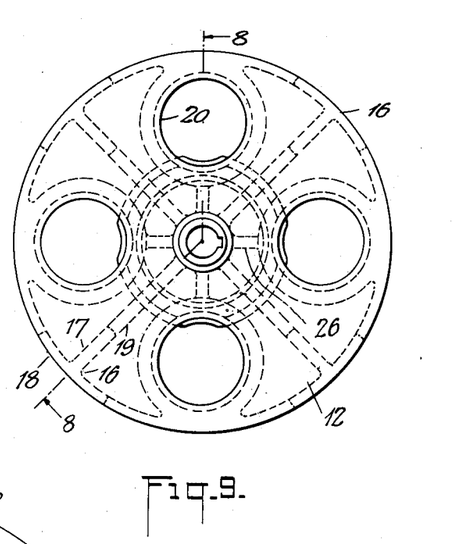
Fig. 9 is a side elevation of the frame or driving element.

As will be more clearly seen in Figs. 8 and 9, the frame 12 comprises two circular disks 14 and 15 connected together by means of four equally spaced struts 16. These struts are substantially T-shaped, as will be seen from Fig. 9. The webs 17 of the struts lie along radii of the frame 12, while the crosspieces 18 of the T are arcuate flanges having substantially the outside diameter of the frame. The webs 17 extend across the inside faces of the disks 14 and 15, as illustrated at 19.

Each of the disks 14 and 15 is bored, as indicated at 20 in Figs. 8 and 9, to house ball-bearings, as will be described hereinafter. The disk 14 is preferably formed integral with the hub 21, which projects a substantial distance beyond the outside face of the disk 14 and is reduced, as indicated at 22. The driving shaft 11 of the apparatus passes thru this hub 21, as shown in Fig. 1, and may be keyed or otherwise securely fastened thereto so as to impart a turning motion to the frame 12. The disk 15 is made with a central opening 23, and is provided with a hub 24 projecting therefrom and is counterbored, as indicated at 25. In order to strengthen the disk 14, webs 26 are provided which extend from the hub 21 to the bosses in which the recess 20 is made.

Referring now more particularly to Fig. 1, the means for rotatably supporting the frame or driving element 12 will now be described. The cover 9 at the driving end of the apparatus is provided with an internally extending hub 27, which carries a suitable bearing for the hub 21 of the frame, as indicated at 29, which recess is in alignment with the reduced end 22 of the hub of the frame 12, so that the ball-bearing races 30 and 31 may be positioned in the cover 9 and the hub 21 of the frame 12, as indicated. Ball-bearings 32, positioned between the races 30 and 31, co-operate therewith to form a suitable ball-bearing for one end of the frame or driving element 12.

The opposite end of the flame 12 is supported as follows: The cover 10 at the driven end of the apparatus is provided with a hub 33, which projects a substantial distance into the space within the outer casing of the apparatus. The end of the hub 33 is cut away, as indicated at 34, and is provided with screw threads, as indicated at 35. The ball-bearing designated generally as 36, and comprising the usual balls and races, is mounted on the hub 33, and held in position by means of the hexagonal nut 37 screwed on the end of the hub. The lock washer 38 is provided and has the upper portion thereof 39, bent over one face of the nut 37 to lock the same in position. The ball-bearing 36 is positioned in the recess 25 of the frame 12, thus supporting the left-hand end of the housing.

The driven shaft 40 of the apparatus is connected at one end to the machinery to be operated and the other end extends a substantial distance into the apparatus and is rotatably supported therein as follows: The cover plate 10 at the driven end of the apparatus is recessed, as indicated at 41, to house the ball-bearing 42, in which the shaft 40 is rotatably mounted. The driven shaft 40 is also supported by the ball-bearing 43, which is positioned in the recess 23 of the housing 12.

The circular recesses 20 in the disks 14 and 15 of the frame 12 have mounted therein the ball-bearings 44 and 45 respectively, as indicated in Fig. 1. These ball-bearings act as supports for the hollow shafts 46, which extend thru the frame 12 and project a substantial distance beyond the outside of the disks 15, as illustrated. The shafts 46 have mounted on them at about the middle of their lengths the ball bearings 47. The ball-bearings 44 are held in position on the hollow shafts 46 by means of the bushings 48 and the hexagonal nuts 49 screwed on the ends of the shafts 46 and locked thereon by the lock washers 50. The ball-bearings 47 are held in position on the shafts 46 by means of bushings 48 and 51. The ball-bearings 45 are held in position by means of the bushings 51 and the hub of a crank (to be described fully hereinafter) which is positioned on the ends of the hollow shafts 46 and prevented from sliding off the same by the flanges 52.

The planetary gears 53 are mounted on each of the four intermediate driving shafts 46 as follows: The bushings 54 are made with circular recesses 55 in which the ball-bearings 47 are positioned. The gear 53 is securely fastened to the collar 54 by screws 28 so that each of the planetary gears 53 may be rotated about its own axis.

The four planetary gears 53 are in continuous engagement with the central or sun gear 56, which is mounted upon the end of the driven shaft 40 and held in position thereon by means of the washer 57 and the bolt 58 threaded into the end of the driven shaft.

It will be understood from the description of the apparatus so far given that the planetary gears have two component movements with respect to the central or sun gear mounted on the driven shaft: (1) The system of four planetary gears is caused to revolve about the driven shaft by virtue of the fact that they are mounted in the frame 12 which is rotated by the driving shaft; and (2), each of the planetary gears rotates about its own axis. The resultant rotation of the driven shaft would therefore be the algebraic sum of these component movements of the planetary gears.

The apparatus now about to be described is that which causes the planetary gears to rotate about their own axes. Clutch members 59 are mounted upon the bushings 48 on the intermediate driving shafts 46 and are provided with a plurality of radial teeth 60 which are adapted to engage with the teeth 61 provided on the faces of the bushings 54 supporting the planetary gears. The intermediate driving shafts 46 and the bushings 48 mounted thereon have elongated diametrically opposite slots 62. The clutch members 59 are feathered on the shafts 46 by means of keys 63 which extend thru the slots 62. The clutch members 59 therefore are permitted to slide longitudinally along the shafts 46 but are prevented from rotating with respect thereto by virtue of the keys 63.

Figure 7:
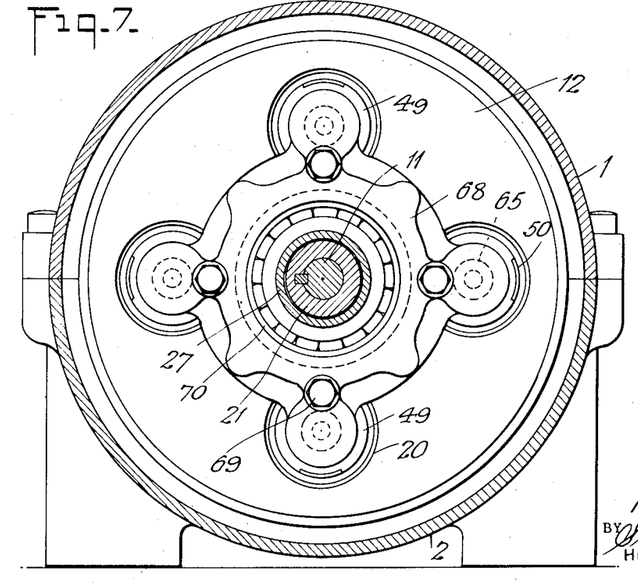
Fig. 7 is a partial cross-sectional view of the apparatus taken substantially along the line 7—7 of Fig. 1, with the cover at the driving end of the apparatus removed.

Each of the planetary gears 53 is supplied intermittently with power to control their rotation thru the alternating engagement and disengagement of the clutch members 59 with the bushings 54 on which the planetary gears are mounted. This alternating engagement and disengagement of the clutch members 59 is brought about by the reciprocation of the rods 64 which pass thru suitable openings in the keys 63. The rods 64 are of substantial length, as illustrated in Fig. 1 and have mounted on their right-hand ends spherical members or balls 65 which are positioned in suitable sockets in the actuating member 66, which comprises two disks 67 and 68 having an outline illustrated in Fig. 7 and fastened together by means of screws 69. This actuating member is rotatably mounted on the ball-bearing 70 positioned on the interior hub of the cover 9 at an angle, as illustrated in Fig. 1, and is prevented from sliding off the hub 27 by means of the lock nut 71 and the washer 72.

As pointed out above, the rotation of the frame 12 by means of the driving shaft 11 causes the intermediate driving shafts 46 to revolve about the center line of the apparatus. From this it will be appreciated that the actuating member 66 will be rotated about the center line of the apparatus. Due to the angularity of the said member 66, it will be clear that as this member rotates about the driving shaft the outer bearings 65 will oscillate longitudinally, thus imparting to the rods 64 a reciprocating motion, which, being transmitted to the clutch members 59, will cause them alternately to engage and disengage with the bushings 54, giving the intermittent motion to the planetary gears described above.

The reciprocation of the clutch members 59 on the intermediate driving shafts 56 is obtained by the following means: The caps 73 are screwed on the sliding rods 64 and extend into the ends of the hollow shafts 46, as shown in Fig. 1 and locking nuts 74 are screwed on the sliding rods 64 to prevent displacement of the caps 73. Helical springs 75 are positioned on the sliding rods 64 and abut against the inside faces of the caps 73 and against the faces of the keys 63, as shown. Locking nuts 76 are screwed on the opposite ends of the sliding rods 64 and prevent the keys 63 from being displaced toward the left-hand ends of the rods 64.

The angularity of the actuating member 66 and the distances between the caps 75 and the locking nuts 76 are such as to cause engagement between any one clutch member 59 and its adjacent bushing 54 to take place, while the intermediate driving shafts 46 upon which these members are mounted revolve thru an angle about the axis of the shafts 11 and 40 of approximately 100°. This ensures that at least one planetary gear will be rotating about its own axis at all times, since there are four planetary gears, each of which is rotating while its driving shaft is revolving thru an angle of approximately 100°, and also one clutch will always be in engagement, since no clutch is disengaged until the succeeding one is engaged, two clutches being engaged through an angle equal to 100° minus 90° or 10°.

The above mentioned angle of 100° may be varied as desired by adjusting the distances between the caps 75 and the locking nuts 76 on the sliding rods 64. It will be understood that the shorter this distance is, the sooner the clutch members 59 will be disengaged and the smaller this angle will become, and vice versa.

It will be appreciated from the above description of the means for actuating the clutches that the angularly mounted actuating member rotating constantly causes the clutch members 59 to be moved during most of the rotation of the driven shaft. Thus the actuating member and the clutch members are moving before the clutches are actually engaged so that there is no sudden functioning of these parts of the apparatus when the two parts of the clutch mechanism are brought together which would cause, in the case of high speed machinery, objectionable vibration.

It will be understood that if the planetary gears 53 are revolving about the central or sun gear 56 in a counter-clockwise direction, and the planetary gears are given a rotation about their own axes in a clockwise direction the resultant rotation of the central gear 56 will be proportionate to the arithmetical sum of these two movements of the planetary gears. On the other hand, if the planetary gears are given a rotation about their own axes in a counter-clockwise direction, they will have a tendency to decrease the speed of the central or sun gear 56, which will be proportionate to the geometrical sum of the two movements of the planetary gears.

The means which are deemed preferable to change the direction of and vary the rotation of the planetary gears 53 about their own axes may be described as follows: Referring now more particularly to Figs. 1, 2, 3, and 11–13, it will be seen that cranks 77 are mounted on the ends of the intermediate driving shafts 46 and held in position thereon by means of flanges 52. These cranks coöperate with the bushings 51 on the shafts 46 to hold the ball-bearings 45 in position, as referred to above. As will be more clearly seen in Fig. 3, the cranks 77 comprise bushings 78 mounted on the shafts 46 and fastened thereto by means of the keys 79, and arms 80, which are connected to bosses 81 positioned on the sides of the arms opposite that on which the bushings 80 lie.

Suitable ball-bearings 82 are mounted on the hubs 81 and held in position thereon by means of the washers 83 and the screws 84, as illustrated in Fig. 1. The ball-bearings 82 are positioned in a groove 85 cut into the face of the cam member 86. The groove 85 is substantially circular in shape, being slightly modified so as to cause cranks 77 to impart to the gears mounted on their shafts a uniform oscillatory motion without speed fluctuations when the clutches 59 are engaged.

The cam 86 has three slots, 87, 88 and 89, cut therein, in which are positioned three rollers, 90, 91 and 92, to support the cam. These rollers are mounted upon the ends of suitable pins, as indicated at 93 in Fig. 1, which pins are threaded and have mounted on one end the nuts 94 to hold them in place. The annular member 95 (see Fig. 1) is fastened to the outside face of the cam 86 by the screws 96 (see Fig. 2) and has cut therein a series of gear teeth, as indicated at 97. The pinion 98 engages with the teeth 97 and is rotatably mounted upon the pin 93. Rotation of the pinion 98 and the cam 86 is obtained by means of the worm 99 on the shaft 100, which is supported in the brackets 101 formed in the lower part of the outer casing and the cover 10. The shaft 100 passes thru a suitable stuffing box 102 and the stuffing box gland 103 and has connected to its outer end convenient means for rotating it, such as hand wheel 104.

It will be appreciated that when the shaft 100 is rotated by the end wheel 104 to rotate the cam 86 the groove 85 in the cam must be moved eccentrically in respect to the center line of the apparatus so that the cranks 77 will be oscillated to impart a rotation to the planetary gears 53. This eccentric movement of the cam 86 is accomplished by virtue of the peculiar shapes of the slots 87, 88 and 89. The slot 87 is concentric with the center line of the apparatus, the slot 89 is straight, while the slot 88 is curved, as shown more clearly in Fig. 10, and is a modification of the shapes of slots 87 and 89 to accommodate the third supporting pin for the cam 86. In the position shown in Fig. 10, the center of the cam surface 85 coincides with the center line of the apparatus. If the cam 86 is rotated by means of the arrangement described above, the pins 90, 92 and 91 in their respective slots 87, 89 and 88 will advance thru the successive positions indicated by the series of circles in each of the slots in Fig. 10, and due to the shapes of the slots the center of the cam groove 85 will lie successively at the places indicated by the small crosses adjacent the center line of the apparatus.

The amplitudes of the oscillations of the cranks 77 will be proportionate to the eccentricities of the cam groove 85.

In the apparatus shown and described herein, it is possible to obtain any variation of speed from 100% forward to 25% rearward, depending upon the setting of the cam 86. It will be appreciated by one skilled in the art that by increasing the length of the slots 87, 88 and 89, an increase of speed may be obtained, and this increase may be as high as 25% of the driving speed.

Figures 11, 12, 13, 14, 15, 16:
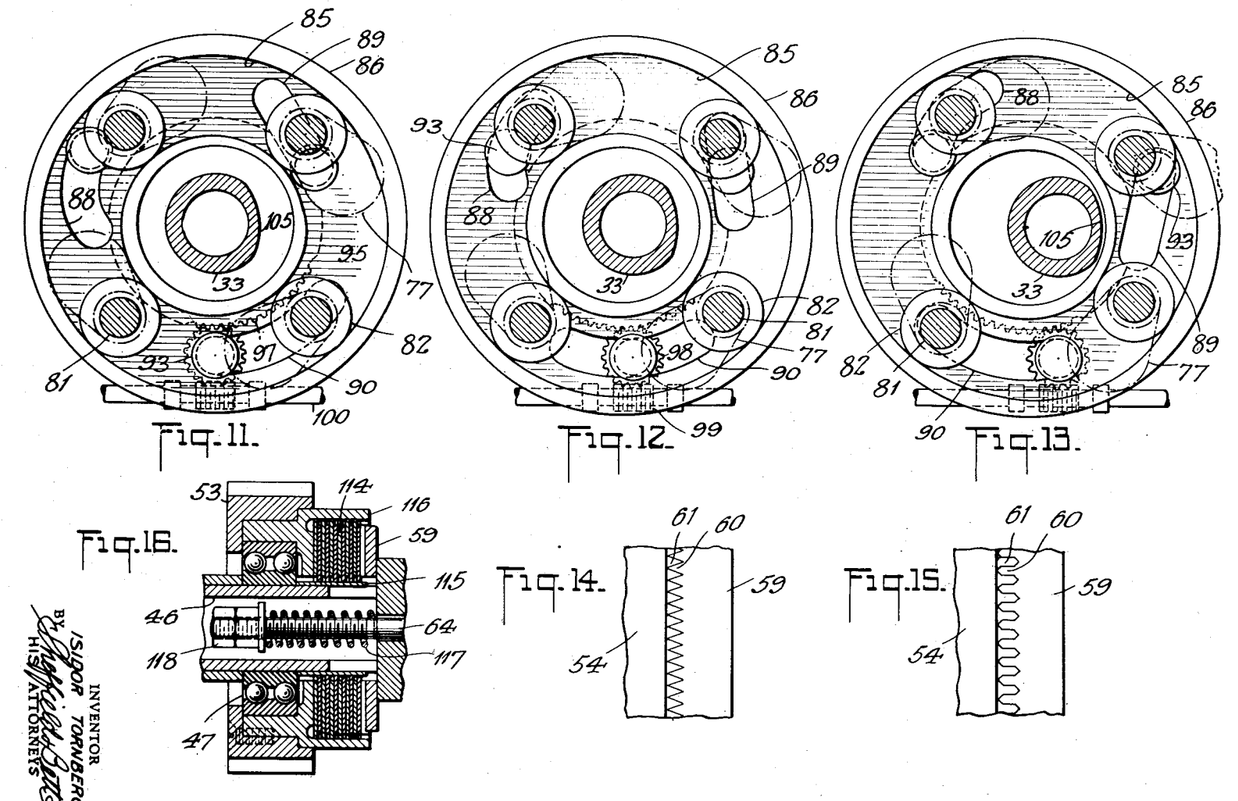
Figs. 11–13 inclusive illustrate the positions of the cam with respect to the center line of the apparatus and three studs upon which the cam is mounted for three typical speed reductions of the apparatus, viz: 100% forward, 50% forward, and 25% rearward, respectively.
Fig. 14 illustrates one type of clutch teeth.
Fig. 15 illustrates the preferred form of the clutch teeth.
Fig. 16 illustrates another form of clutch, in which a plurality of fixed and rotatable frictional elements are employed instead of the serrated teeth of Fig. 14 or the teeth shown in Fig. 15.

The relative positions of the pins 90, 92 and 91 in the slots 87, 89 and 88 for three typical speeds, such as 100% forward, 50% forward and 25% rearward, are illustrated in Figs. 11–13 respectively.

In Fig. 11, representing 100% forward speed, it will be seen that the supporting pins 90, 91 and 92 are positioned at one end of the slots 87, 88 and 89; while in Fig. 12, representing 50% forward speed, these pins are in an intermediate position in the slots; and in Fig. 13, representing 25% rearward speed, the pins are positioned at the opposite ends of the slots.

As will be clearly seen from Fig. 13, the hub 33 has been flattened, as indicated at 105, so as to provide clearance for the cam when the latter is placed in its most eccentric position.

While the clutch members 59 are engaging with and disengaging from bushings 54, these two parts are revolving at approximately the same speed, so that there is no tendency for one to slide past the other and to cause injury to the teeth.

The form of teeth illustrated in Fig. 14 will be suitable, but it may be desirable to make the teeth with parallel sides and pointed ends and roots, as illustrated in Fig. 15. This form of teeth facilitates the ready engagement of the clutch members 59 with the bushings 54 and at the same time does away with any substantial force tending to separate these two parts, such as might arise in connection with the use of the wedge-shaped teeth shown in Fig. 14.

The cover plates 9 and 10 are provided with caps 106 which are screwed or otherwise fastened to the covers and fit closely around the driving shaft 11 and the driven shaft 40. The inside faces of these caps are provided with shoulders 107 which abut against the sides of the adjacent ball-bearings (29, 30, 32 and 41), as shown in Fig. 1. Ball-bearing (29, 30, and 32) is also held in position by means of the collar 108 on the driving shaft 11, and the ball-bearing 41 is held in position by means of the lock nut 109 and the washer 110 on the driven shaft 40.

In order to prevent leakage of any lubricating matter around the driving and driven shafts, suitable packing 111 is placed in the caps 106 and held in position therein by means of washers 112 and retaining rings 113, which may be and preferably are resilient members engaged in suitable grooves in the caps 106, as illustrated.

The fragmentary cross-section shown in Fig. 16 illustrates a modified form of clutch mechanism in which two sets of co-operating disks 114 are employed. One set of disks are splined on the sleeves 115 which are slidingly mounted on the hollow shafts 46, while the other set of disks are splined to the bushings 116 to which the planetary gears 53 are fastened, as described above. Reciprocation of the clutch members 59 by the oscillation of the sliding rods 64 causes the two sets of disks 114 to contact with and separate from one another successively to drive the planetary gears 53.

In this form of clutch the resilient springs 117, mounted on the sliding rods 64 and abutting against the lock nuts 118 and the keys 63, are employed to relieve the pressure between the two sets of disks. Since the two sets of disks engage and disengage while being rotated at the same speed, no rubbing of one set of disks against the other set will occur, thus assuring the long life of the clutch mechanism.

Figure 17:
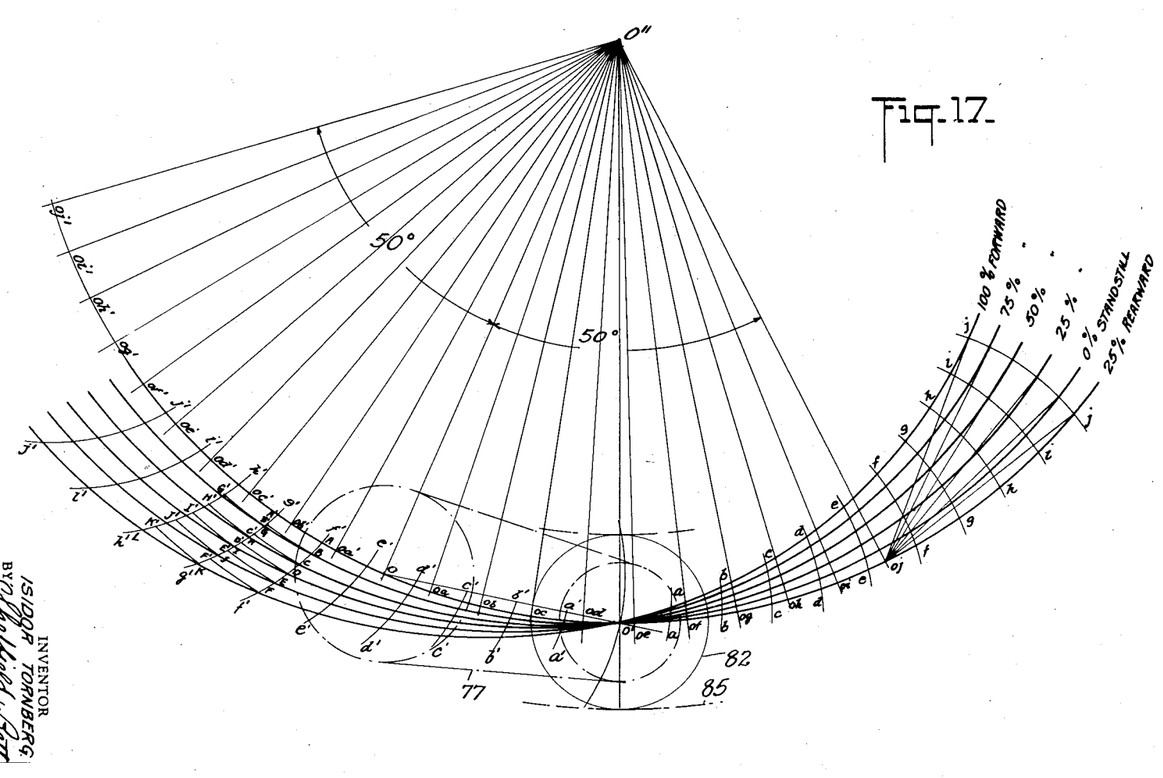
Fig. 17 is a diagrammatical representation of the cam path positions for several speed reductions of the apparatus.

Fig. 17 is a diagrammatical representatioon of the cam path positions for several of the speed reductions and is plotted as follows: From the point $o''$ a vertical line $o''$—$o'$ is drawn. The distance $o'$—$o$ equal to the length of the cranks 77, which is equivalent to the distance between the center line of the intermediate driving shafts 46 and the center line of the ball-bearings 82 which operate in the cam groove 85, is laid off to the left of $o'$ and a line $o''$—$o$ drawn through these points.

With the line $o''$—$o$ as a center line, an angle of 50° is laid out on each side of this line, as shown in the drawing. The entire angle thus represented (100°) is approximately the angle thru which the frame or driving element 12 revolves while any one clutch member 59 is in engagement. The angle thus formed is divided into twenty equal parts, as shown. With a radius equal to the distance $o''$—$o'$, an arc is drawn thru the point $o$ with point $o''$ as the center, which arc is labeled "100% forward". Five more curves, indicated as "75% forward" to "25% rearward" respectively are drawn, as shown, representing the middle of the cam groove 85 for the various eccentric positions of the cam to produce the indicated speed reductions.

Figure 10:
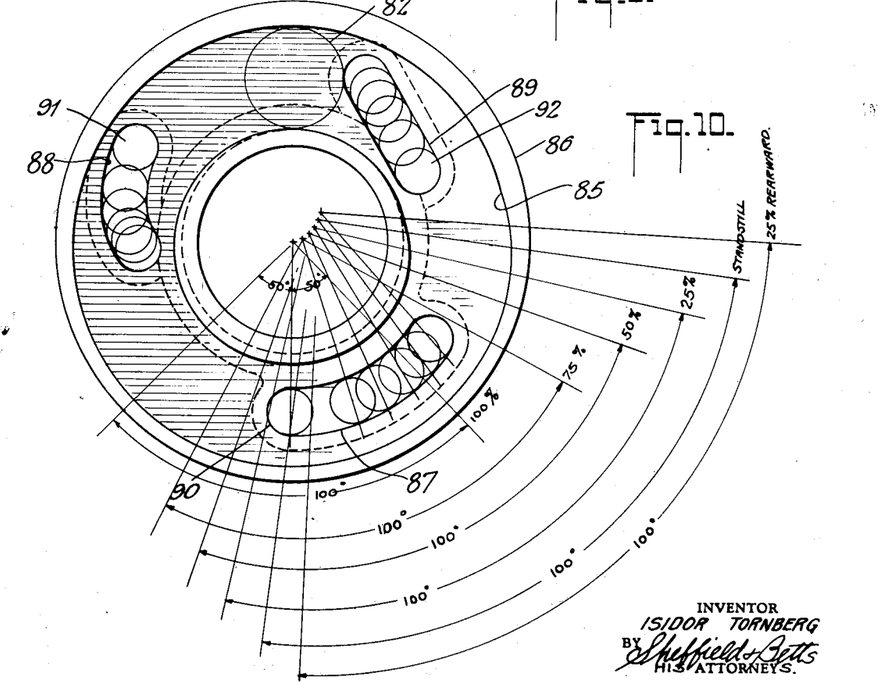
Fig. 10 is a side elevation of the cam, showing the respective positions and shapes of the slots therein in which the supporting means for the cam are positioned.

As pointed out above, the cam groove 85 is not made exactly circular because this form of groove would cause a fluctuating speed to be given to the driven shaft. As it is desirable to have the driven shaft rotate at a constant speed for any given speed reduction, the cam groove 85 deviates slightly from the circular form, as shown in Fig. 10.

In order better to illustrate the object of this cam diagram, the cranks 77 are indicated by the dotted lines. Point $o'$ of this figure corresponds to the center line of the ball-bearings 82 which move in the cam groove 85 and the point $o$ represents the center line of the intermediate driving shafts 46.

The points at which the sub-divisions of the 100° angle intersect the "100% forward" arc are labeled on one side of the point $o$ as $oa$, $ob$, etc., to $oj$, and on the other side of the point $o$ as $oa'$, $ob'$, etc., to $oj'$. These points indicate the successive positions of the point $o$, representing the center line of the intermediate driving shafts 46 as these shafts revolve thru the 100° angle indicated.

With the points $oa$, $ob$, etc., as centers, the arcs $a$—$a$, $b$—$b$, etc., are drawn on one side of the central point $o$, and on the other side with the points $oa'$, $ob'$, etc., as centers, the arcs $a'$—$a'$, $b'$—$b'$, etc., are drawn. The distances between the intersections of any one of these arcs, such as the arc $f'$—$f'$, with the six arcs representing the cam path positions, indicated as "100% forward" to "25% rearward" inclusive, which points are labeled A—F inclusive, show the comparative oscillations of the cam roller 82 for the various eccentricities of the cam surface 85 when the center lines of the intermediates driving shafts are at the point $of'$.

With the point $o''$ as a center, arcs are drawn thru the points A—F inclusive, which arcs intersect the arc $g'$—$g'$ at the points A'—F' inclusive. In the same way the arcs G—G' to K—K' are drawn with the point $o''$ as a center. It will be seen from this diagram that the amounts of the oscillation of the cam roller 82 varies as the eccentricity of the cam surface is varied. This is represented on the diagram by the difference in the distances B'—G, C'—H, D'—I, E'—J, F'—K, measured along the arc $g'$—$g$. It will also be seen that the distance F'—K on the arc $g'$—$g'$ and the distance K'—L on the arc $h'$—$h'$ are equal. This indicates that the angular movement and therefore the angular velocity of the cranks 77 remain constant, while the point $o'$ indicating at the center line of the cam roller 82 moves along the arc labeled "100% forward" from the point F to the point L. In other words, the speed of rotation of the planetary gears about their own axes is constant while the frame or driving element 12 revolves thru the 100° angle represented in the diagram.

In view of the above description, the operation of the present apparatus may be described briefly as follows: When the cam 86 is in its central or concentric postion and the driving shaft 11 is connected with a suitable source of power, the driven shaft 40 will be rotated at the same speed as the driving shaft. The frame or driving element 12, connected to the driving shaft 11, will be rotated at the speed of the latter and will cause the four intermediate driving shafts 46 to revolve about the center line of the apparatus, carrying with them the planetary gears 53. The actuating member 66, being connected with the intermediate driving shafts 46 thru the medium of the four sliding rods 64, will be caused to rotate in angular relation with the driving shaft 11.

As hereinbefore explained, this rotation of the actuating member 66 causes the sliding rods 64 to reciprocate back and forth, resulting in the intermittent engagement of the clutch members 59 with the bushings 54, upon which the planetary gears 53 are mounted. While any one clutch is in engagement with its associated bushing, the driving element 12 and driving member 66 rotate thru an angle of approximately 100°, and since there are four equally spaced intermediate driving shafts 46 with the clutch members 59 mounted thereon, at least one clutch will always be in engagement.

The duration of the engagement, as described above, is determined by the angularity of the actuating member 66 with respect to the driving shaft 11 and the relative positions of the caps 73 and the locking nuts 76 on the sliding rods 64. It will of course be appreciated that while four intermediate driving shafts have been employed in the present embodiment, either less than or more than this number of shafts may be employed, and the period of engagement of each of the clutches should be varied so that at least one clutch will be in engagement during the rotation of the driving element.

Since the cam 86 is in its central or concentric position, the planetary gears 53 will not be given an independent rotation about their own axes through the medium of the cranks 77, because the rollers 82 on the ends of these cranks are travelling in a path concentric with the path of rotation of the intermediate driving shafts 46 and the driven shaft 40 will be rotated at the same speed as the driving shaft 11, thus preventing rotation of the intermediate gears and so locking the driving shaft with the driven shaft.

When the cam 86 is placed in an eccentric position, the rollers 82 traveling in the cam groove 85 move in a path which is not concentric with the path of the revolution of the intermediate driving shafts 46 about the center line of the apparatus and consequently impart oscillation to the intermediate driving shafts, which oscillation is transmitted in one direction to the planetary gears 54. This rotation of the planetary gears 53 may be in such a direction as to rotate the driven gear 56 in the direction in which it is being rotated by the revolution of the planetary gears about the center line of the apparatus so as to increase the speed of the driven shaft, or it may be in a direction opposite to that in which the driven gear 56 is being rotated by this revolution of the planetary gears, in which case the driven shaft will be rotated at a reduced speed. It will be understood that the speed and direction of rotation of the driven shaft is controlled by the direction and amount of the eccentricity of the cam 86.

Figure 18:
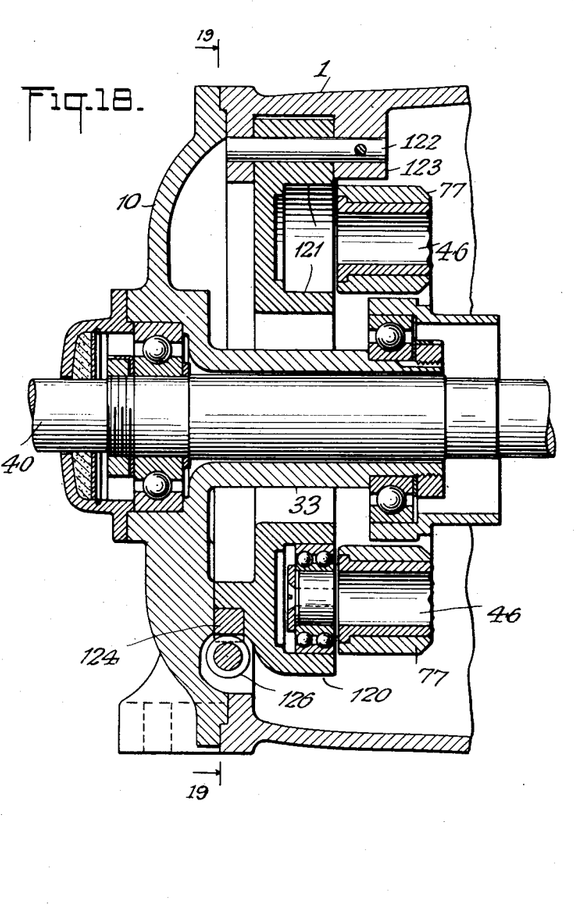
Fig. 18 is a partial longitudinal sectional view of the driven end of the apparatus illustrating another form of cam and the means for moving it eccentrically.
Figure 19:
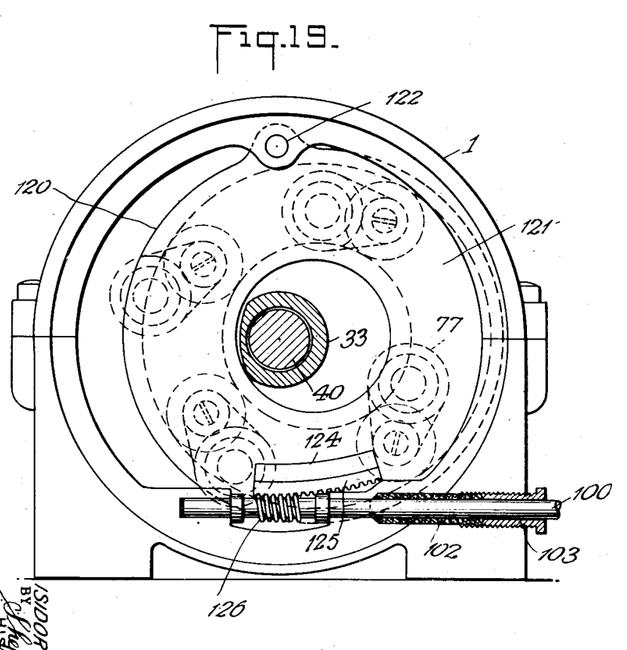
Fig. 19 is a cross sectional view taken substantially along the line 19—19 of Fig. 18.

As pointed out above, the apparatus may be designed so that the driven shaft may be rotated in the same direction as the driving shaft and at an increased speed, or it may be brought to a stand-still or rotated in the opposite direction at speeds proportionate to the speed of the driving shaft.

Where the apparatus described herein is to be used in an installation in which it is not essential that the driven shaft have an absolute constant speed for any given speed reduction, a simplified form of cam may be employed. As illustrated in Figs. 18 and 19, a cam 120 having a true circular groove 121 cut therein, is pivotally mounted at its upper end upon the pin 122, which is securely held in the lugs 123 preferably formed integral with the outer casing of the apparatus.

The means for swinging the cam 120 about the pin 122 so as to position the cam groove 121 eccentric to the centerline of the apparatus are similar to those previously illustrated and described. A segment 124, suitably connected to the cam by means not shown, and having gear teeth 125 cut therein engages with the worm 126 which is rotated by a handwheel as described above. Rotation of the hand wheel will cause the cam to be moved about the pin 122 so as to place the cam in an eccentric position, such as is shown in Fig. 19. Therefore, when the driving element 12 is caused to rotate and carries with it the cranks 77, the rollers 82 will travel in the cam groove 121, and due to the eccentricity thereof, they will be oscillated and will impart to the intermediate driving shafts 46 a rotation which according to its direction will increase or decrease the speed of the driven shaft in proportion to the eccentricity of the cam setting.

Having thus described this form of my invention, I do not wish to be understood as being limited to the details of form and ar- rangement of parts set forth, for various changes may be made without departing from the spirit and scope of my invention.

What I claim and desire to protect by Letters Patent is:

1. A device for transmitting power at variable speeds from a driving shaft to a driven shaft, comprising a driving element mounted on said driving shaft, intermediate elements rotatably carried by said driving element, a driven element mounted on said driven shaft and engaging said intermediate elements, means rotatably mounted in said driving element for intermittently and successively engaging said intermediate elements to rotate the same and means for imparting a uniform speed of rotation to said rotatable means.

2. A device for transmitting power at variable speeds from a driving shaft to a driven shaft comprising, a driving element mounted on said driving shaft, intermediate elements rotatably carried by said driving element, a driven element mounted on said driven shaft and engaging said intermediate elements, rotatable members connected with said intermediate elements and adapted to rotate the same whereby said driven shaft is rotated and means for rotating said members independently of the rotation of said driving element, said means being adapted to impart a uniform speed of rotation to said members.

3. A device for transmitting power at variable speeds from a driving shaft to a driven shaft, comprising a driving element mounted on said driving shaft, intermediate elements rotatably carried by said driving element, a driven element mounted on said driven shaft and engaging said intermediate elements, rotatable members connected with said intermediate elements and adapted to rotate the same whereby said driven shaft is rotated and means for rotating said members independently of the rotation of said driving element, the ends of said members being constrained to rotate in a predetermined path to move said members and means for varying said path to obtain the desired speed reductions, said constrained movement being adapted to impart a uniform speed of rotation to said members.

4. A device for transmitting power at variable speeds from a driving shaft to a driven shaft, comprising a driving element mounted on said driving shaft, intermediate shafts rotatably carried by said driving element, intermediate elements mounted on said intermediate shafts, a driven element mounted on said driven shaft and engaging said intermediate elements, rotatable members mounted on said intermediate shafts and adapted to rotate the same, means for rotating said members independently of the rotation of said driving element, the ends of said members being constrained to move in a predetermined path to rotate said members and means for varying said path to obtain the desired speed reductions, said constrained movement being adapted to impart a uniform speed of rotation to said members.

5. A device for transmitting power at variable speeds from a driving shaft to a driven shaft, comprising a driving element mounted on said driving shaft, intermediate shafts rotatably carried by said driving element, intermediate elements mounted on said intermediate shafts, a driven element mounted on said driven shaft and engaging said intermediate elements, rotatable members mounted on said intermediate shafts and adapted to rotate the same, means for rotating said members independently of the rotation of said driving element, and a member adapted to be moved independently of the rotation of said driving and driven shafts and engaging the ends of said members along a predetermined path to rotate said members, said path being designed to cause said members to have a uniform speed of rotation.

6. A device for transmitting power at variable speeds from a driving shaft to a driven shaft, comprising a driving element mounted on said driving shaft, intermediate elements rotatably carried by said driving element, a driven element mounted on said driven shaft and engaging said intermediate elements, means intermittently and successively engaging said intermediate elements to rotate the same, and means for varying the rotation of said intermediate elements during said engagement independently of the rotation of said driving element, said varying means comprising a cam and followers connected with said engaging means, said cam having a predetermined shape such as to rotate said intermediate elements at constant speed during the engagement.

7. A device for transmitting power at variable speeds from a driving shaft to a driven shaft, comprising a driving element mounted on said driving shaft, intermediate elements rotatably carried by said driving element, a driven element mounted on said driven shaft and engaging said intermediate elements, means intermittently and successively engaging said intermediate elements to rotate the same and means connected with said engaging means and adapted to be moved angularly and independently of the rotation of said driving element and means for imparting a uniform angular velocity to the last named means.

8. A device for transmitting power at variable speeds from a driving shaft to a driven shaft, comprising a driving element mounted on said driving shaft, intermediate elements rotatably carried by said driving element, a driven element mounted on said driven shaft and engaging said intermediate elements, means intermittently and successively engaging said intermediate elements to rotate the same, an actuating member angularly mounted with respect to said driving shaft and rotated by said driving element and adapted by the rotation thereof to actuate said engaging means, members adapted to be moved angularly and independently of the rotation of said driving element during said engagement to cause rotation of said engaging means and means for moving said members with uniform angular velocity, said latter means comprising a cam adapted to be moved eccentrically to the axis of said shafts.

9. A device for transmitting power at variable speeds from a driving shaft to a driven shaft, comprising a driving element mounted on said driving shaft, intermediate elements rotatably carried by said driving element, a driven element mounted on said driven shaft and engaging said intermediate elements, means intermittently and successively engaging said intermediate elements to rotate the same and means connected to said engaging means and adapted to be moved angularly at a constant speed with relation to the speed of said driving element to rotate said intermediate elements uniformly during said engagement.

10. A device for transmitting power at variable speeds from a driving shaft to a driven shaft, comprising a driving element mounted on said driving shaft, intermediate gears rotatably carried by said driving element, rotatable shafts on which said gears are carried, a driven gear mounted on said driven shaft and engaging said intermediate gears, clutches intermittently and successively engaging said intermediate gears to rotate the same, the number of said intermediate gears and their respective periods of engagement being such that at least one of said intermediate gears shall be fixed on its shaft at any time during the rotation of said driving element, means for controlling said periods of engagement, cranks connected with said clutches and a cam engaging said cranks and adapted to be moved transversely with respect to the axis of rotation of said driving element, said cam having a predetermined shape such as to rotate said clutches uniformly during the engagement with said gears.

11. A device for transmitting power at variable speeds from a driving shaft to a driven shaft, comprising a driving element mounted on said driving shaft, intermediate gears rotatably carried by said driving element, rotatable shafts on which said gears are carried, a driven gear mounted on said driven shaft and engaging said intermediate gears, clutches carried on said shafts and intermittently and successively engaging said intermediate gears to rotate the same, an oscillating actuating member rotated by said driving element and adapted to actuate said clutches, adjustable means connected between said clutches and said actuating member, adjustment of said means being adapted to vary said periods of engagement, radial arms carried by said shafts and adapted to be moved angularly and independently of the rotation of said driving element to control the rotation of said intermediate gears, a cam, the ends of said arms being constrained to move in a predetermined path on said cam to move said radial arms angularly and means for varying the position of said cam to obtain the desired speed reductions, said path being of such design that said radial arms are moved with uniform angular velocity for any given cam position.

ISIDOR TORNBERG.